US 6,607,588 B2

United States Patent
Batlaw

(10) Patent No.: US 6,607,588 B2
(45) Date of Patent: Aug. 19, 2003

(54) COLORANTS FOR USE WITHIN INK SYSTEMS

(75) Inventor: Rajnish Batlaw, Spartanburg, SC (US)

(73) Assignee: Milliken & Co., Spartanburg, SC (US)

( * ) Notice: Subject to any disclaimer, the term of this patent is extended or adjusted under 35 U.S.C. 154(b) by 166 days.

(21) Appl. No.: 09/947,491

(22) Filed: Sep. 6, 2001

(65) Prior Publication Data

US 2003/0061964 A1 Apr. 3, 2003

(51) Int. Cl.[7] .................................................. C09D 11/00
(52) U.S. Cl. ................... 106/31.27; 106/31.29; 106/31.43; 106/31.5; 106/31.51; 106/31.6; 106/31.61; 106/31.75; 106/31.79; 106/31.8
(58) Field of Search ........................ 106/31.27, 31.29, 106/31.51, 31.43, 31.5, 31.6, 31.61, 31.75, 31.79, 31.8

(56) References Cited

U.S. PATENT DOCUMENTS 5,567,470 A * 10/1996 Koshida et al. ............. 427/151
5,621,022 A * 4/1997 Jaeger et al. ................ 523/161
6,200,370 B1 * 3/2001 Fujiwara et al. ......... 106/31.48
6,235,096 B1 * 5/2001 Meyrick et al. ......... 106/31.43

* cited by examiner

Primary Examiner—Helene Klemanski
(74) Attorney, Agent, or Firm—Terry T. Moyer; William S. Parks

(57) ABSTRACT

Novel addition products of hydroxyl-protecting groups (such as isocyanates) with oxyalkylene-substituted intermediates, such as poly(oxyalkylenated) aniline compounds, for the eventual production of substituted, and substantially pure, colorants, particularly diazo and triphenylmethane derivatives, through the reaction of such intermediates with certain reactants are provided. These new colorants exhibit improved wax and/or oil solubility and high purity, particularly due to the inability of certain impurities to deleteriously react with the protected hydroxyl groups of either the intermediate or the colorant during and/or after formation thereof. A method for producing such novel colorants through utilization of these novel substantially pure colorant intermediates is also provided.

9 Claims, No Drawings

COLORANTS FOR USE WITHIN INK SYSTEMS

FIELD OF THE INVENTION

This invention relates to novel addition products of hydroxyl-protecting groups (such as isocyanates) with oxyalkylene-substituted intermediates, such as poly(oxyalkylenated) aniline compounds, for the eventual production of substituted, and substantially pure, colorants, particularly diazo and triphenylmethane derivatives, through the reaction of such intermediates with certain reactants. These new colorants exhibit improved wax and/or oil solubility and high purity, particularly due to the inability of certain impurities to deleteriously react with the protected hydroxyl groups of either the intermediate or the colorant during and/or after formation thereof. A method for producing such novel colorants through utilization of these novel substantially pure colorant intermediates is also provided.

BACKGROUND OF THE PRIOR ART

All U.S. patents cited within this specification are hereby incorporated by reference.

Wax-based and/or oil-based ink and ink-jet systems require compatible colorants therein to provide the most effective and reliable printing results. Derivatives of poly(oxyalkylenated) dyes and/or colorants are particularly desired for these end-uses because of their miscibility, high color strength characteristics, as well as ease in handling liquid colorants of this nature. The hydroxyl groups of such poly(oxyalkylenated) colorants and/or dyes are susceptible to adventitious attack by Lewis acids and bases present within the reaction medium. Unfortunately, such an attack renders the colorant unreactive, and incapable of modifications designed to tailor wax- and/or oil-solubility or compatibility. Such unreactive, residual species are generally present as impurities in the desired colorants. Such unwanted reaction products create undesirable possibilities of reduced colorant solubilities, viscosity modifications, weakening of color strengths, and other like problems, such as discussed within certain prior art references, including U.S. Pat. Nos. 5,782,966 to Bui et al., and 5,637,638 to Chandler et al., as well as European Patent Application 769,509 to Banning et al. Such references indicate the problems associated with typical prior art processes for manufacturing certain dyes (including wax-based ink types) and/or colorants. Thus, removal or, more importantly, avoidance of ways to generate these unreactive species is absolutely necessary for providing reliable and effective dyes and/or colorants for such end-use applications. These prior art references illustrate ways to tailor the desired physical properties via the reaction of isocyanate with the dyes and/or colorants themselves after formation of such compounds. Unfortunately, such a reaction modifies the colorants as long as they are reactive. It has no effect on colorants that have been rendered unreactive. Such a synthetic route would therefore always produce unwanted unreactive impurities that are detrimental to the performance of these products in the desired ink systems. A more reliable process and thus a more reliable dye and/or colorant compound is thus necessary to provide the industry with a high color strength, optimum viscosity, high purity dye and/or colorant, particularly within wax-based and/or oil-based ink applications. The prior art teachings have not provided a sufficiently consistent soluble wax-based dye and/or colorant due to these adventitious reaction problems. The costs involved in purification necessary to ensure the finished dye and/or colorant is viable and not off-quality have proven excessive enough to merit the need for even greater improvements within this technological field.

Examples of polyoxyalkylene substituted colorants include those taught within U.S. Pat. No. 5,919,839, and EP 0 896 038 A2 describe phase change, or hot melt inks utilizing the reaction product of an isocyanate (e.g., octadecyl isocyanate) and hydroxyl containing colorant to form a colored urethane wax. Other examples of such reactions include U.S. Pat. No. 5,919,846 and PCT patent Application WO 94/14902 (all describing the reaction of hydroxyl containing colorants with mono and diisocyanates). These colorants, in order to be utilized within such hot melt ink systems require high purity and complete compatibility within the wax-based ink system. The presence of electrophilic species, in this case, phthalates for example, in the urethane substituted xanthene colorants reduces the compatibility of these colorants in such wax based ink systems. U.S. Pat. No. 4,833,197 describes an offset ink using diluents, for example, mineral oils with a boiling range of 200°–350° C., and no more than 20% of aromatic components. Again, however, electrophilic phthalates present within the urethane-substituted xanthene colorants remain insoluble in these diluents, thus making these colorants unsuitable for use in these applications. Such a problem is inherent as well with other electrophiles.

Thus, even though poly(oxyalkylenated) dyes and/or colorants have only recently been made available to the wax-based ink market, the utilization of such colorants, particularly made from certain poly(oxyalkylenated) intermediates and other reactants, has still been limited due to the lack of complete compatibility in wax and/or oil based systems due to the formation of the aforementioned deleteroius electrophile-hydroxyl reaction products. There thus exists a need to improve upon this procedure and ultimately to produce a novel intermediate which provides the ability of forming highly desirable derivatized oxyalkylenated dyes and/or colorants but does not require a multi-step process in forming the intermediate alone which furthermore precludes the formation of deleterious phthalates. To date, the prior art has not accorded such an improvement within this specific area of colorant chemistry. Because of the lack of such a specific type of dye and/or colorant intermediate, the versatility and widespread use of such colorants in different types of inks and substrates has not been available. There is thus a need to provide wax-based and/or oil-based ink-jet colorants and compositions that are readily and consistently soluble due to reduction of electrophilic reaction products. To date, there have been no improvements for such wax-based dyes and/or colorants reducing the possible production of deleterious electrophile impurities thus permitting consistent use within, as one possible end-use, wax-based ink-jet inks.

OBJECTS OF THE INVENTION

Therefore, one of the objects of the invention is to provide a thoroughly wax- and/or oil-soluble urethane-substituted dye and/or colorant. Another object of this invention is to provide a synthetic route for such a dye and/or colorant wherein all reactive sites are substituted with hydroxyl-protecting groups, such as urethanes, ethers, diurethanes, and combinations thereof. Another object of the invention is to provide a specific urethane substituted aniline intermediate for the production of a urethane substituted dye and/or colorant. Still another object of the invention is to provide an intermediate that is an addition product of poly(oxyalkylene) aniline and an isocyanate for use in the manufacture of dyes and/or colorants, for instance poly(oxyalkylenated) diazo or triphenylmethane colorants. A further object of the invention is to provide an addition product of an isocyanate with a polyoxyalkylenated aniline intermediate which will alternatively form a dyestuff and/or colorant upon reaction with selected reactants and cannot be readily attacked by electrophilic groups and/or impurities within the reaction medium, and thus provides excellent yield of the desired colorant alone. Yet another object of this invention is to provide a relatively inexpensive method for producing such beneficial urethane-substituted dyes and/or colorants.

Accordingly, this invention encompasses an aniline derivative intermediate comprising at least one constituent selected from the group consisting of urethanes, ethers, diurethanes, and any combinations thereof, wherein said at least one constituent is a capped moiety further comprising from about 2 to about 200 moles oxyalkylene groups having from 2 to 18 carbon atoms, glycidol, glycidyl, and any combinations thereof, and wherein said constituent is solely bonded to any amine groups present on said aniline derivative intermediate. The term "aniline derivative" is intended to encompass any phenyl-based compound with at least one nitrogen atom bonded directly to the phenyl moiety and that does not also include a hydroxyl group bonded directly to the phenyl moiety (and thus is not an aminophenol).

Such hydroxyl-protecting groups include, but are not limited to reaction products of the terminal hydroxyls on the oxalkylene, glycidol, or glycidyl groups and compounds such as isocyanates, acid halides, acid anhydrides, diisocyanates (further reacted with an alcohol to form a diurethane), and the like, as well as mixtures thereof. Isocyanates are most preferred thereby forming urethane-based colorants after reaction between the hydroxyl and the isocyanate itself. The purpose for the presence of such groups is noted in greater detail below, but the term "hydroxyl-protecting group" or its plural form is intended to encompass any of such urethane, ether, or diurethane pendant groups present to prevent attack of the terminal hydroxyls by electrophilic species or other impurities within the reaction medium and which is not susceptible to attack itself (and thus removal from the hydroxyl moieties) by the same electrophiles and/or impurities. In such a manner, the desired colorants exhibit the characteristics desired of polymeric [poly(oxyalkylenated)] colorants without the potential problems associated with attack on such free hydroxyls.

Since the oxyalkylene groups as noted above, as well as any other potential hydroxyls present on the ring, are reactive, the reaction with a certain amount of such hydroxyl-protecting groups [e.g., isocyanates and diisocyanates (such as, without limitation, alkyl types, including octadecyl isocyanate, n-butyl isocyanate, and the like, and phenyl and/or substituted phenyl types, including without limitation, toluene diisocyanate, and the like)] produces the desired protected pendant groups (e.g., urethane moieties) thereon. Most preferably, at least two hydroxyl-protecting groups (and thus, for example at least two urethane groups) are present. As one example, the most preferred intermediate compound encompassed within this invention conforms to the structure of Formula (I)

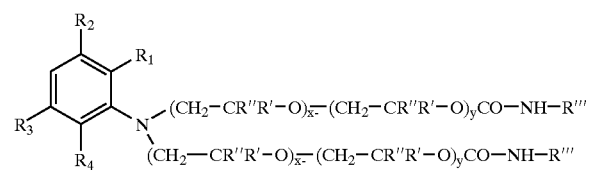

wherein $R_1$, $R_2$, $R_3$, and $R_4$ are either the same or different and represent hydrogen, hydroxyl, halogen, such as Cl, Br, or F, $C_1$–$C_4$ alkyl, $C_1$–$C_4$ alkoxy, $C_1$–$C_4$ alkylsulfonyl, $C_1$–$C_4$ alkylsulfamoyl, $C_5$–$C_6$ cycloalkylsulfamoyl, nitro, cyano, carbomoyl, trifluoromethyl, $C_1$–$C_4$ alkoxycarbonyl, $C_1$–$C_4$ alkanoyl, $C_1$–$C_4$ alkylcarbamoyl, phenoxy, phen($C_1$–$C_4$)alkoxy, phenylcarbamoyl, phenylsulfonyl, phenylsulfamoyl, benzoyl, or phenylazo groups, with each group optionally subsituted with halogens or $C_1$–$C_4$ alkyl or $C_1$–$C_4$ alkoxy groups; wherein x+y is greater than 0 and less than 4; wherein R' is selected from the group consisting of hydrogen, $C_1$–$C_{10}$ alkoxy, $C_1$–$C_{10}$ polyoxyalkoxy, $C_1$–$C_{10}$ alkylester, and $C_1$–$C_{10}$ alkyl; wherein R" is selected from the group consisting of hydrogen and $C_1$–$C_4$ alkyl groups; and wherein R'" is selected from the group selected from hydrogen, $C_1$–$C_4$ alkyl groups, phenyl, substituted phenyl, and any combinations thereof. Preferably R" is H, methyl, ethyl, Cl, Br or I, R" is hydrogen, methyl, or ethyl, and R'" is hydrogen, methyl, or ethyl. In a more preferred embodiment, the aniline derivative intermediate is substituted with methyl or ethyl, or is unsubstituted, i.e. $R_1$, $R_2$, $R_3$, and $R_4$ are all H. The intermediate is prepared from aniline which is reacted with from 2 to 200 moles of at least one constituent selected from the group of oxyalkylenes having from 2 to 18 carbon atoms, glycidol, and glycidyl, and any combinations thereof, wherein said constituent is solely bonded to the amine. It should be evident to the ordinarily skilled polymeric colorant artisan that addition of specific chain lengths of such oxyalkylene monomers is imperfect and thus the number of moles present thereon such an aniline-based compound is indicative of the average number of moles added, and not the specific number. Preferably, R'" is selected from $C_1$–$C_{24}$ alkyl, more preferably from $C_4$ to $C_{18}$.

Furthermore, the inventive colorants produced by the reaction of certain reactants with this specific type of intermediate include diazos, triphenylmethanes, and the like, preferably conforming with the following structures (II), (III), and (IV):

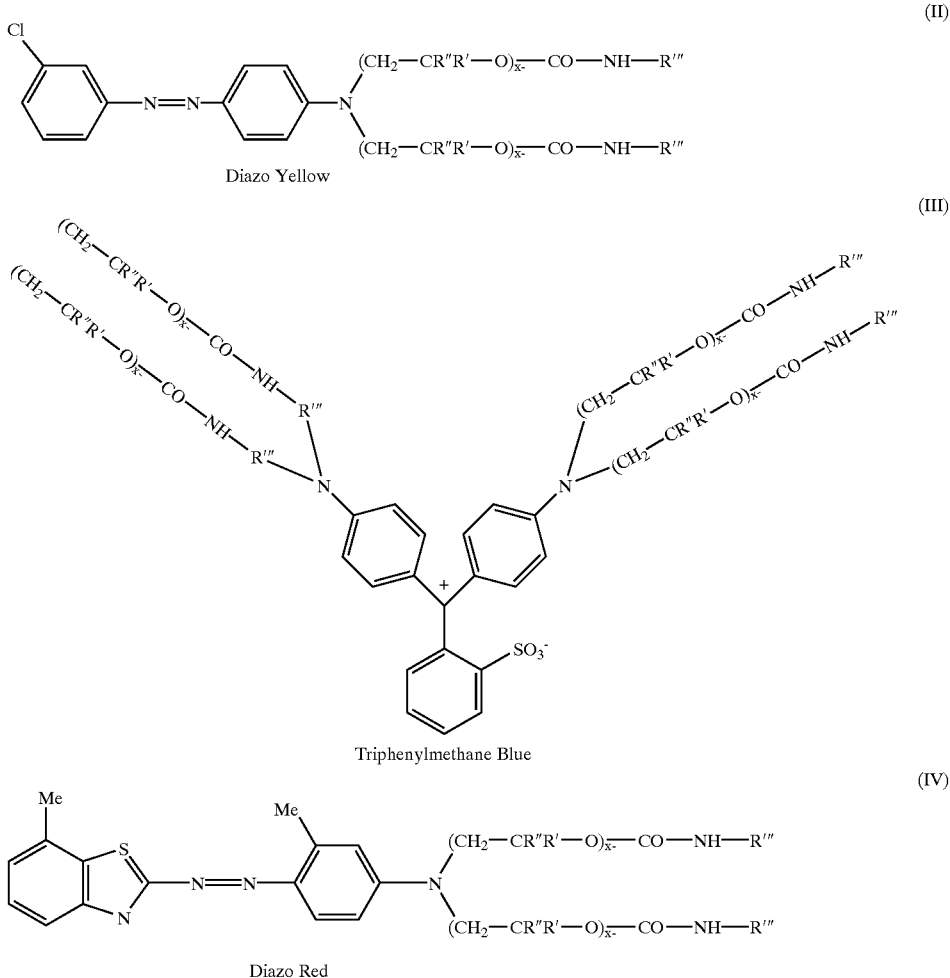

Diazo Yellow

Triphenylmethane Blue

Diazo Red wherein for each of (II), (III), and (IV), above, R' is selected from the group consisting of hydrogen, $C_1$–$C_{10}$ alkoxy, and $C_1$–$C_{20}$ alkyl; wherein R" is selected from the group consisting of hydrogen, $C_1$–$C_{10}$ alkoxy, and $C_1$–$C_{20}$ alkyl; wherein R''' is selected from the group consisting of hydrogen, $C_1$–$C_{24}$ alkyl groups, phenyl, substituted phenyl, and any combinations thereof; and x is from 1 to 100; or any salts thereof (such as salts with inorganic or organic anions, including, without limitation, halides, sulfonates, hydrogen sulfonates, methylsulfates, and the like).

Such an aniline intermediate in Formula (I) is useful in producing the colorants of Formulae (II), (III), and (IV).

DETAILED DESCRIPTION OF THE INVENTION

The amino group of said aniline is di-substituted with an addition product of an isocyanate and a poly(oxyalkylene) substituent having a straight or branched polymer chain selected from oxyalkylene oxide, glycidyl, and glycidol. In one embodiment, at least one mole of the urethane-substituted aniline is reacted with phthalic anhydride or other aromatic compound having an aldehyde functionality available. A second mole of urethane substituted aniline may also be provided to form a triphenylmethane colorant. This novel intermediate has the advantage that colorants made from the intermediate is totally compatible in the wax-based and/or oil-based ink systems, and that colorants of various families, such as diazos, triphenylmethanes, methines, and the like, can be produced from this intermediate. Thus, reactants utilized to produce such novel colorants include, without limitation, diazonium salts, aminobenzaldehydes, diazotized compounds, and the like, which would be clearly appreciated by the ordinarily skilled artisan within the colorant industry (the term "colorant" is intended to encompass any compound which absorbs in the visible spectrum).

In particular, it is highly desirable to provide a method of forming an addition product of an isocyanate with a specific polyoxyalkylenated aniline intermediate. Furthermore, the aniline intermediate encompassed within this invention thus comprises from 2 to about 200 moles, preferably, from 3 to about 100, more preferably from about 3 to about 50, and most preferably from about 3 to about 10, of at least one constituent selected from the group of oxyalkylene groups having from 2 to 18 carbon atoms, alkoxy alkylester groups having from 2 to 18 carbon atoms, glycidol, and a glycidyl group wherein said constituent is solely bonded to the amine, and any free hydroxyls are reacted with isocyanate such as octadecyl isocyanate. Such a method of producing the addition product of an isocyanate with such a specific oxyalkylenated aniline intermediate is also contemplated within this invention as well. The amine constituent may reside in any position relative to other pendant groups (such as straight or branched alkyl chains, straight or branched alcohol chains, and the like) on the benzene ring (i.e., p-toluidine, o-toluidine, m-toluidine, p-anisidine, o-anisidine, or m-anisidine); however, aniline and m-toluidine are preferred. Thus, the preferred aniline intermediate is also contemplated within this invention as is the method of making such a compound, as defined by the Formula (I), above. Such a method comprises the reaction of from 2 to 200 moles of at least one compound selected from the group consisting of an alkylene oxide having from 2 to 18 carbon atoms and glycidol with in-aniline at a temperature of from about 120 to about 250° F. The invention also covers the actual compound of Formula (I), above as well. Preferably R' above (for both I and II) is hydrogen, $C_{1-4}$ alkoxy, or $C_{1-4}$ alkyl; most preferably R' is hydrogen. Also, preferably R" is methyl or ethyl (most preferably methyl), and R" is preferably H. R'" is selected from the group consisting of $C_1$–$C_{24}$ alkyl, preferably R'" is $C_{12}$–$C_{24}$ alkyl, most preferably R'" is $C_{18}$.

It is an advantage of the present invention that the urethane substituted dye and/or colorant can be design engineered to obtain desired properties for specific printing platforms and architectures. It is also an advantage, though not a requirement, of the present invention that the urethane substituted dye and/or colorant is very pure, being free of salts and other insoluble contaminants. It is another advantage of the present invention that the urethane substituted dye and/or colorant can be used in combination with other ink carrier materials to obtain ink compositions that possess excellent spectral strengths. It is still another advantage, though not a requirement, of the present invention that the urethane substituted dye and/or colorant is substantially transparent. These and other aspects, features, and advantages are obtained by the use of such inventive intermediates (such as urethane-substituted anilines) to form such substituted colorants that are suitable for use with waxes and/or oils in phase change ink jet inks and offset inks that may be employed in direct or indirect printing applications.

It has been found that the reaction of isocyanates with oxyalkylenated aniline compounds and other reactants (as discussed above), ultimately results in the formation of a dye and/or colorant substantially modified by the reaction of the nucleophilic hydroxyl groups of the intermediate and substantially free of unmodified, insoluble impurities, which are completely compatible in wax and/or oil systems. The structures (II), (III), and (IV) above are merely preferred embodiments of such a broad range of possible dyes and/or colorants.

As noted above, such novel intermediates permit production of colorants made therefrom that are substantially modified by the reaction of the nucleophilic hydroxyl groups with isocyanates. A low amount of such an unwanted electrophile-hydroxyl reaction product may be produced on the final colorant product; however, such an amount is drastically reduced in comparison with the previously followed production methods without isocyanate-capped hydroxyl moieties of the inventive intermediate. Thus, the amount of unwanted eletrophile-hydroxyl reaction product provided by the inventive method and thus found on the target dye and/or colorant is below about five to ten molar percent in total. Such an amount is thus the definition of the term "substantially pure" as well.

Such inventive substantially pure urethane-based colorants may be utilized in any number of coloring procedures, including ink, paint, print, dye, tint, and the like, applications. Thus, compositions utilized to provide colorations to various substrates, including, without limitation, cellulose-based substrates (paper, cotton fabrics, and the like), magazine-paper substrates, and the like, are preferred surfaces for coloring. Other surfaces, substrates, etc., may be contacted with the inventive colorants as well. Most preferably, however, such colorants are to be utilized in ink applications, most notably inkjet, lithographic, and offset ink operations. The offset printing process is used to print newsprint, magazines, signage, and like procedures and end-uses. In such operations, it is important to provide long-term solution stability of the colorant within the target ink solution and water resistance of the printed image from the ink composition. For inkjet inks, particularly wax-based types, heat stability of the entire ink system is of paramount importance, since the printing process comprises numerous periods of heating and cooling cycles in order for the inks to perform the desired print operation. Thus, such inks must be able to retain their color strength upon evaluation of exposure at 150° C. for prolonged and/or intermittent periods (e.g., 30 minutes or 5 minutes heated, 5 minutes cooled, 5 minutes heated, and so on, as merely examples). The color difference between an initial print and an oven-aged print is calculated using the following equation:

$$\Delta E^* = ((L^*_{initial} - L^*_{aged})^2 + (a^*_{initial} - a^*_{aged})^2 + (b^*_{initial} - b^*_{aged})^2)^{1/2}$$

wherein $\Delta E^*$ represents the difference in color between the initial printed sample and the sample printed with oven aged ink. $L^*$, $a^*$, and $b^*$ are the color coordinates; wherein $L^*$ is a measure of the lightness and darkness of the print sample; $a^*$ is a measure of the redness or greenness of the print sample; and $b^*$ is a measure of the yellowness or blueness of the print sample. For a further discussion and explanation of this testing procedure, see Billmeyer, F. W., et al., *Principles of Color Technology*, 2nd Edition, pp. 62–64 and 101–04. Thus, the inks must exhibit a minimal change in color over such time (e.g., $\Delta E^*$ of at most 1.5).

For offset inks, and particularly heat-set inks, generally, such compositions include alkyds as heat-set inks used primarily as pigment-wetting vehicles (although they may also improve the stability of the ink, improve the gloss of the ink on the target substrate, and affect water pick-up after contact with the desired surface). High boiling petroleum distillates are utilized as the diluent/solvent components therein within such heat-set offset ink formulations. Other additives commonly found within such offset inks are polyethylene (slip agent), organic aluminum compounds (rheology modifiers), and low molecular weight micronized hydrocarbon resins (to increase ink tack).

For lithographic inks (cold set), generally, such compositions function through penetration of the ink within the target substrate (e.g., paper, for example). Mineral oil or vegetable oils are utilized as carriers within such compositions with small amounts of varnish (typically gilsonite or hydrocarbon-based resins, as examples) added to control the lithographic properties of the ink composition, with components, such as bentonite, for example, added for rheology control.

Wax-based inkjet inks are generally solid at room temperature and subsequently heated to a temperature above its melting point and maintained at a temperature above about 150° C. wherein the composition must exhibit fluid physical properties required for inkjet printing methods. Thus, these inkjet ink composition generally comprise two component types: colorants and vehicles for the colorants. The vehicle often consists of a blend of polymers which function to control the viscosity temperature profile and balance the performance of the ink in the printhead with the performance of the ink on the target substrate surface (e.g., again, paper). Such polymers tend to be based upon fatty acids, urethanes, and natural and/or synthetic waxes.

DESCRIPTION OF THE PREFERRED EMBODIMENTS

Without limiting the scope of the invention, the preferred features of the invention are hereinafter set forth.
Intermediate Synthesis

EXAMPLE 1

100 parts of a polyoxyalkylene (with an average of 10 moles of ethylene oxide present thereon) substituted aniline intermediate were charged into a reactor vessel with 111 parts of octadecenyl isocyanate, and 2.0 parts of dibutyltindilaurate catalyst. The mixture was heated with stirring to 70° C. under a $N_2$ atmosphere. After 4.0 hours at 70° C. an FT-IR spectrum of the product was obtained to insure all isocyanate functionality is consumed. The absence (disappearance) of a peak at about 2275 $cm^{-1}$ (NCO) and the appearance (or increase in magnitude) of peaks at about 1740–1680 $cm^{-1}$ and about 1540–1530 $cm^{-1}$ corresponding to urethane frequencies, thereby confirm the conversion of the isocyanate to the urethane.

EXAMPLE 2

100 parts of the polyoxyalkylene (having an ethylene oxide to propylene oxide ratio of about 1:1, and an average of about 5 moles of each alkylene oxide present thereon) substituted aniline intermediate were charged into a reactor vessel with 98 parts of octadecylisocyanate, and 2.0 parts of dibutyltindilaurate catalyst. The mixture was heated with stirring to 70° C. under a $N_2$ atmosphere. After 4.0 hours at 70° C. an FT-IR spectrum of the product was obtained to insure all isocyanate functionality is consumed. The absence (disappearance) of a peak at about 2275 $cm^{-1}$ (NCO) and the appearance (or increase in magnitude) of peaks at about 1740–1680 $cm^{-1}$ and about 1540–1530 $cm^{-1}$ corresponding to urethane frequencies, thereby confirm the conversion of the isocyanate to the urethane.

Colorant Production

The general methods of making the preferred inventive colorants are as follows:

EXAMPLE 3

(Diazo—Yellow)

135 parts of 98% sulfuric acid was charged to a flask containing 452 parts of water followed by 111 parts of 3-chloroaniline and 12 parts of 2-ethylhexanol. This mixture was allowed to stir for 0.5 hr. Separately a mixture of 71.3 parts of sodium nitrite and 233 parts of water was prepared in a beaker. This was charged to the flask slowly, keeping the temperature of the contents in the flask between 0 and 5° C. After the addition is complete, the contents were allowed to stir for 2 hours while maintaining a temperature between 0 and 5° C. In a separate beaker, coupler was prepared by mixing 683 parts of the intermediate prepared in Example 1 with 683 parts of toluene. The diazonium salt in the flask is added to the coupler slowly maintaining a temperature <10° C. After the addition is complete, the mixture is allowed to stir for 1 hour. The acid is neutralized with a caustic solution, the product washed with water, and dried. A UV/VIS spectrum of the bright yellow product shows a lambda max absorbance at 425 nm in toluene, and a half height band width of 120 nm.

EXAMPLE 4

(Triphenylmethane—Blue)

1000 parts of the intermediate from Example 1 was charged to a flask containing 66 parts of p-dimethylaminobenzaldehyde and 14 parts of urea. To this mixture was charged 90 parts of muriatic acid over a 5 minute period. This mixture was allowed to heat up to 95–105° C., and maintained at this temperature overnight. At the end of the hold period, the reaction mixture was allowed to cool to 75° C., and 120 parts of p-benzoquinone was added. The mixture was allowed to stir for 1.5 hrs maintaining a temperature of 75–85° C. The acid is neutralized with a caustic solution, the product washed with water, and dried. A UV/VIS spectrum of the bright mid range blue product shows a lambda max absorbances at 548 nm and 607 nm in toluene.

EXAMPLE 5

(Diazo—Red)

160 parts of 98% sulfuric acid was charged to a flask containing 117 parts of water followed by 120 parts of acetic acid and 1 part of 2-ethylhexanol. 38 parts of 2-aminobenzothiazole was added slowly to allow complete mixing. This mixture was allowed to stir for 0.5 hr maintaining a temperature below 0° C. 95 parts of nitrosyl sulfuric acid was added slowly to this mixture slowly maintaining a temperature <0° C., This mixture was allowed to stir for 2.5 hours maintaining a temperature 0 and –5° C. At the end of the hold period, the diazotization is complete, and the diazo is added to a coupler prepared by mixing 167 parts of the intermediate from Example 2 and 167 parts of toluene maintaining temperature <10° C. After the addition is complete, the mixture is allowed to stir for 1 hour. The acid is neutralized with a caustic solution, the product washed with water, and dried. A UV/VIS spectrum of the the bright red product shows a lambda max absorbance at 489 nm in toluene, and a half height band width of 130 mn.

EXAMPLE 6

Ink Jet Ink 20 parts of the yellow colorant produced in Example 3 was mixed with a color stick from Xerox for a Phaser™ 850 printer under heat (120–150° C.). The product was allowed to mix well while hot and poured into an aluminum dish. This mixture was subjected to several heating and cooling cycles to determine compatibility through these cycles. The product appeared to be completely compatible with the wax systems throughout the heating/cooling cycles.

EXAMPLE 7

Offset Based Ink 5 parts of the blue colorant produced in Example 4 was mixed with a 98 parts of the black offset base 1K-01967 from CPS. The product was completely compatible. The final mixture was used as an ink and drawn down on paper. The image on paper is a toned black (b value of 2.89 vs 3.51 for untoned black base) and indicated that the individual components of the ink were completely compatible.

There are, of course, many alternate embodiments and modifications of the present invention which are intended to be included within the spirit and scope of the following claims.

What is claimed is:

1. An ink composition comprising a colorant conforming to the structure of Formula (II)

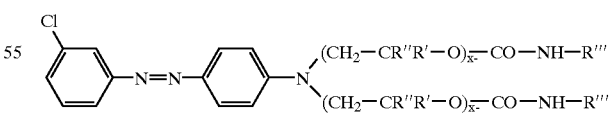

(II)

wherein R' is selected from the group consisting of hydrogen, $C_1$–$C_{10}$ alkoxy, and $C_1$–$C_{20}$ alkyl; wherein R" is selected from the group consisting of hydrogen, $C_1$–$C_{10}$ alkoxy, and $C_1$–$C_{20}$ alkyl; wherein R''' is selected from the group consisting of hydrogen, $C_1$–$C_{24}$ alkyl groups, phenyl, substituted phenyl, and any combinations thereof; and x is from 1 to 100; or any salts thereof.

2. The ink composition of claim 1 wherein said ink composition further comprises a wax within which said colorant is soluble.

3. An ink composition comprising a colorant conforming to the structure of Formula (III)

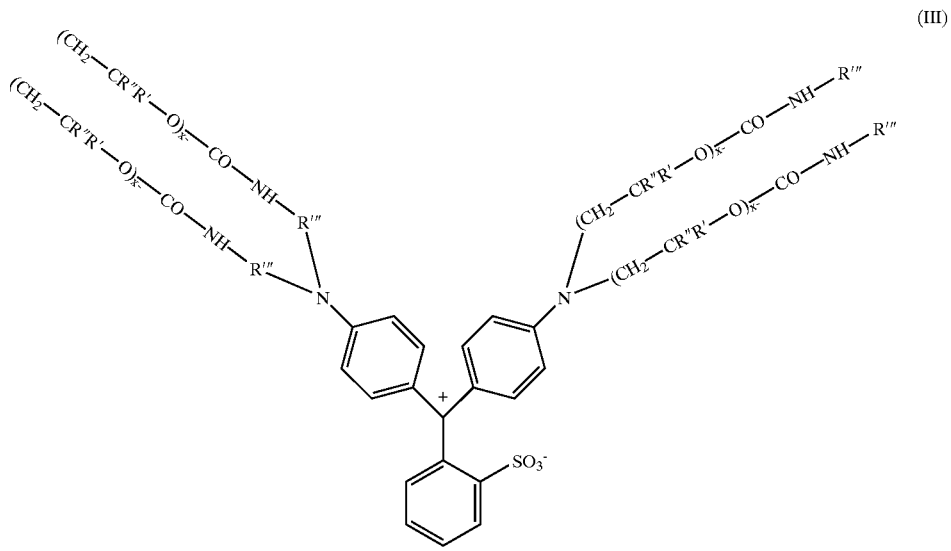

(III)

wherein R' is selected from the group consisting of hydrogen, $C_1$–$C_{10}$ alkoxy, and $C_1$–$C_{20}$ alkyl; wherein R" is selected from the group consisting of hydrogen, $C_1$–$C_{10}$ alkoxy, and $C_1$–$C_{20}$ alkyl; wherein R'" is selected from the group consisting of hydrogen, $C_1$–$C_{24}$ alkyl groups, phenyl, substituted phenyl, and any combinations thereof; and x is from 1 to 100; or any salts thereof.

4. The ink composition of claim 3 wherein said ink composition further comprises a wax within which said colorant is soluble.

5. An ink composition comprising a colorant conforming to the structure of Formula (IV)

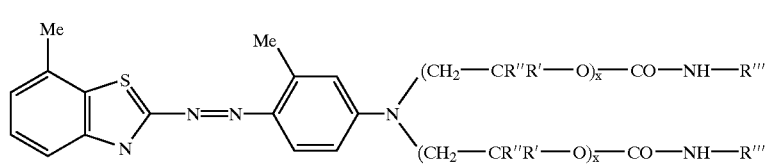

(IV)

wherein R' is selected from the group consisting of hydrogen, $C_1$–$C_{10}$ alkoxy, and $C_1$–$C_{20}$ alkyl; wherein R" is selected from the group consisting of hydrogen, $C_1$–$C_{10}$ alkoxy, and $C_1$–$C_{20}$ alkyl; wherein R'" is selected from the group consisting of hydrogen, $C_1$–$C_{24}$ alkyl groups, phenyl, substituted phenyl, and any combinations thereof; and x is from 1 to 100; or any salts thereof.

6. The ink composition of claim 5 wherein said ink composition further comprises a wax within which said colorant is soluble.

7. The ink composition of claim 1 wherein said ink composition further comprises a carrier selected from the group consisting of mineral oils, vegetable oils, and any mixtures thereof, and a varnish component.

8. The ink composition of claim 3 wherein said ink composition further comprises a carrier selected from the group consisting of mineral oils, vegetable oils, and any mixtures thereof, and a varnish component.

9. The ink composition of claim 5 wherein said ink composition further comprises a carrier selected from the group consisting of mineral oils, vegetable oils, and any-mixtures thereof, and a varnish component.

* * * * *